Patented Dec. 22, 1953

2,663,733

UNITED STATES PATENT OFFICE 2,663,733

PREPARATION OF NITRILOTRIPROPION-AMIDE

Lee A. Subluskey, Wilmington, Del., assignor to Hercules Powder Company, Wilmington, Del., a corporation of Delaware No Drawing. Application March 6, 1951, Serial No. 214,197

4 Claims. (Cl. 260—561)

This invention relates to the preparation of $\beta,\beta',\beta''$-nitrilotripropionamide and more particularly to the preparation of this product from acrylamide.

In accordance with this invention it has been found that $\beta,\beta',\beta''$-nitrilotripropionamide may be prepared by reacting acrylamide with ammonia. The product is not only obtained in high yields but the process is one whereby this important product may be produced on a commercial scale.

The following examples will illustrate the process of preparing $\beta,\beta',\beta''$-nitrilotripropionamide in accordance with this invention. All parts and percentages are by weight unless otherwise indicated.

Example 1

A mixture of 535 parts of a 45% aqueous solution of acrylamide and 500 parts of 28% aqueous ammonium hydroxide was allowed to react at room temperature for 12 hours. The solution was then evaporated to about one-fifth its original volume whereupon the $\beta,\beta',\beta''$-nitrilotripropionamide which had formed crystallized. On filtration, a yield of 230 parts (89% of the theoretical yield) of the crude product having a melting point of 176°–181° C. was obtained. On recrystallization from a mixed methanol-water solvent, the $\beta,\beta',\beta''$-nitrilotripropionamide had a melting point of 185°–186° C.

Example 2

A mixture of 10 parts of acrylamide, 1.0 part of ammonia and 90 parts of water was reacted by heating at 50° C. for 18 hours. The solution was then evaporated to dryness under reduced pressure. The yield of crude $\beta,\beta',\beta''$-nitrilotripropionamide (melting point 165°–176° C.) so obtained was 100%.

Example 3

A mixture of 5 parts of acrylamide and 0.5 part of ammonia dissolved in 10 parts of water was allowed to react at room temperature for 36 hours. The solution was then evaporated to dryness under reduced pressure to give a 100% yield of a crude $\beta,\beta',\beta''$-nitrilotripropionamide having a melting point of 177°–182° C.

Example 4

Three parts of gaseous ammonia was added slowly to a solution of 30 parts of acrylamide in 70 parts of water. The reaction mixture was then allowed to stand for 18 hours at room temperature. On evaporation to dryness under reduced pressure a 100% yield was obtained of a crude $\beta,\beta',\beta''$-nitrilotripropionamide having a melting point of 176°–182° C.

In accordance with this invention it has been found that $\beta,\beta',\beta''$-nitrilotripropionamide may be prepared in high yields by the action of ammonia on acrylamide.

The reaction between the acrylamide and ammonia is readily carried out in aqueous medium. However, any solvent which is inert to these reactants and which is capable of solubilizing the two reagents may be used. Exemplary of inert organic solvents which may be used are methanol, ethanol, propanol, benzene, toluene, xylene, etc. Any form of ammonia as, for example, gaseous ammonia, liquid ammonia, or an aqueous solution of ammonia may be used for the reaction. The ammonia is added to a solution of the acrylamide usually containing from about 10 to about 40% of the acrylamide. More concentrated solutions may be used if desired as, for example, 50 or 60% of the acrylamide, up to the limit of its solubility in the reaction medium being used. The amount of ammonia added to the acrylamide solution should be, for economy of the acrylamide, at least the theoretical amount required for the reaction; i. e., one mole for 3 moles of acrylamide, and preferably is used in excess, in an amount of from 0.15- to 18-mole.

The two reagents may simply be mixed and allowed to stand at room temperature until the reaction is complete, or the mixture may be heated. In general, the reaction may be carried out at a temperature of from about 0° C. to about 100° C. Higher temperatures may be used, if desired, but the yield may be reduced due to polymerization of the acrylamide. Preferred temperatures for the reaction are from about 15° C. to about 80° C. and more preferably from about 20° C. to about 50° C. The reaction may be carried out at atmospheric or superatmospheric pressure.

The $\beta,\beta',\beta''$-nitrilotripropionamide may be isolated by concentrating the solution and allowing it to crystallize out of the concentrated solution or by evaporating the solution to dryness, the product obtained in the latter case being more crude. On recrystallization from water or a mixed alcohol-water solvent, the $\beta,\beta',\beta''$-nitrilotripropionamide may be obtained as a pure product having a melting point of 185.5°–186° C.

One of the outstanding advantages in the preparation of $\beta,\beta',\beta''$-nitrilotripropionamide in accordance with this invention is the high yield of the product which is obtained without the formation of any appreciable amount of side reactions.

For example, there is very little of the undesired $\beta,\beta''$-iminodipropionamide formed as may be seen from the foregoing examples. The latter product has a melting point of 148° C. whereas even the crude products of these examples had melting points far above this and in fact of a range indicating an order of purity of the triamide of 95% or better.

$\beta,\beta',\beta''$-nitrilotripropionamide is an important intermediate in the preparation of crease-proofing textile finishing agents. By reacting this product with a methylolating agent such as formaldehyde and insolubilizing or curing this reaction product on a textile material it is possible to produce a textile having outstanding crease-resistance properties. The process of this invention makes it possible to produce this intermediate on a commercial scale and thus enables the commercial production of this outstanding textile finishing agent.

What I claim and desire to protect by Letters Patent is:

1. The process of preparing $\beta,\beta',\beta''$-nitrilotripropionamide which comprises reacting acrylamide with ammonia in a molar ratio of from about 3:1 to about 3:19 at a temperature of from about 0° C. to about 100° C.

2. The process of preparing $\beta,\beta',\beta''$-nitrilotripropionamide which comprises reacting a solution of acrylamide in an inert solvent with ammonia in a molar ratio of from about 3:1 to about 3:19 at a temperature of from about 0° C. to about 100° C.

3. The process of preparing $\beta,\beta',\beta''$-nitrilotripropionamide which comprises reacting an aqueous solution of acrylamide with ammonia in a molar ratio of from about 3:1 to about 3:19 at a temperature of from about 0° C. to about 100° C.

4. The process of preparing $\beta,\beta',\beta''$-nitrilotripropionamide which comprises reacting an aqueous solution of acrylamide with ammonia in a molar ratio of from about 3:1 to about 3:19 at a temperature of from about 15° C. to about 80° C.

LEE A. SUBLUSKEY.

References Cited in the file of this patent

UNITED STATES PATENTS

| Number | Name | Date |
| --- | --- | --- |
| 2,120,933 | Dittmar | June 14, 1938 |
| 2,580,832 | Pietrusza | Jan. 1, 1952 |

OTHER REFERENCES

Morsch: "Monatshefte fur Chemie;" vol. 63 (1933), pp. 220–229.